(12) United States Patent
Oomura et al.

(10) Patent No.: US 7,548,039 B2
(45) Date of Patent: Jun. 16, 2009

(54) MOTOR CONTROL UNIT

(75) Inventors: Naoki Oomura, Fuji (JP); Kazunobu Nagai, Yokohama (JP); Shinichi Kominato, Tokyo (JP); Yukihisa Hasegawa, Yokohama (JP); Minoru Awazu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 179 days.

(21) Appl. No.: 11/819,642

(22) Filed: Jun. 28, 2007

(65) Prior Publication Data
US 2008/0042614 A1    Feb. 21, 2008

(30) Foreign Application Priority Data
Jun. 28, 2006    (JP) ............... 2006-178322

(51) Int. Cl.
*H02P 21/00* (2006.01)
*H02P 1/46* (2006.01)
*G05D 3/12* (2006.01)

(52) U.S. Cl. .................. 318/788; 318/717; 318/807; 318/809

(58) Field of Classification Search .......... 318/788, 318/712, 717, 799, 807, 809, 727, 800
See application file for complete search history.

(56) References Cited

U.S. PATENT DOCUMENTS 5,278,486 A * 1/1994 Kim ................. 318/811
7,017,377 B2 * 3/2006 Hosoito et al. ............ 68/12.16
7,141,948 B2 * 11/2006 Kifuku et al. ............... 318/432
7,161,317 B2 * 1/2007 Matsushita et al. ......... 318/432
2006/0043917 A1 * 3/2006 Kifuku et al. ............... 318/432
2006/0076832 A1 * 4/2006 Matsushita et al. ........ 307/10.1

FOREIGN PATENT DOCUMENTS

JP    2005-292898    10/2005

* cited by examiner

*Primary Examiner*—Paul Ip
(74) *Attorney, Agent, or Firm*—Pillsbury Winthrop Shaw Pittman, LLP

(57) ABSTRACT

A motor control unit including a rotational position detector detecting a rotational position of a brushless DC motor; a current detector detecting a current of the brushless DC motor; a coordinate transformer executing rotational coordinate transformation of the current by a control phase angle and obtaining a d-axis current and a q-axis current; a current controller generating a command d-axis voltage based on a d-axis current error, and generating a command q-axis voltage based on a q-axis current error; a coordinate transformer generating a three-phase command voltage by the control phase angle; a conductive signal generator; and a position controller that, when executing a positioning operation, maintains the command d-axis current at a constant value and the command q-axis current at zero, and that controls the control phase angle based on a difference between a target stop rotational position and a rotational position detected by the rotational position detector.

16 Claims, 15 Drawing Sheets

| θ (R_theta_com) | CORRECTED a PHASE VOLTAGE | CORRECTED b PHASE VOLTAGE | CORRECTED c PHASE VOLTAGE |
|---|---|---|---|
| 300 ≦ θ < 360[°] | Va | Vb | Vc -S_phase_userM20 |
| 240 ≦ θ < 300[°] | Va +S_phase_userM20 | Vb | Vc |
| 180 ≦ θ < 240[°] | Va | Vb -S_phase_userM20 | Vc |
| 120 ≦ θ < 180[°] | Va | Vb | Vc +S_phase_userM20 |
| 60 ≦ θ < 120[°] | Va -S_phase_userM20 | Vb | Vc |
| 0 ≦ θ < 60[°] | Va | Vb +S_phase_userM20 | Vc |

FIG. 8

MOTOR CONTROL UNIT

This application is based upon and claims the benefit of priority from the prior Japanese Patent Application 2006-178322, filed on, Jun. 28, 2006 the entire contents of which are incorporated herein by reference.

FIELD

The present disclosure is directed to a motor control unit that executes positioning control.

BACKGROUND

Surveying instruments, surveillance cameras, and semiconductor manufacturing and testing devices require high-precision in their positioning control. Wide spread use of battery driven products have also lead to growing demand in both efficient operation and high-precision positioning. A positioning control unit is generally provided with a position feed back loop that generates a command rotational speed of the motor based on position error and a speed feed back loop that generates command current or command voltage of the motor based on speed deviation.

JP 2005-292898 A discloses a positioning control unit that generates command values to be delivered to a servo motor by combining a target position with corrected data generated in advance for absolute positioning control. The corrected data is generated by positioning the servo motor at predetermined constant angles, measuring the absolute positions of the specified positioning by a high-resolution encoder, and obtaining angle error data from position data of the high-resolution encoder and position data of the encoder of the servo motor.

The positioning control controls the motor by a processor driven digital control. In such case, data resolution (data length) and signal wave resolution of a PWM control circuit is constrained by hardware limitation of the processor, thus resolution of output torque pertaining to the motor is also constrained. Thus, regardless of remarkable improvement in resolution of position detectors of encoders, it has not been possible to achieve positioning of angle precision on the order of seconds ("), for example, by the conventional motor control unit.

SUMMARY

An object of the present disclosure is to provide a motor control unit capable of high-precision positioning control.

A motor control unit of the present disclosure includes a rotational position detector that detects a rotational position of a brushless DC motor; a current detector that detects a current of the brushless DC motor; a coordinate transformer that executes rotational coordinate transformation of the current detected by the current converter by using a control phase angle, and that obtains a d-axis current constituting a magnetic flux component and a q-axis current constituting a torque component perpendicular thereto; a current controller that generates a command d-axis voltage based on a difference between a command d-axis current and a d-axis current detected by the current detector, and that generates a command q-axis voltage based on a difference between a command q-axis current and a q-axis current detected by the current detector; a coordinate transformer that generates a three-phase command voltage by executing rotational coordinate transformation of the command d-axis voltage and the command q-axis voltage by using the control phase angle; a conductive signal generator that generates a three-phase conductive signal based on the three-phase command voltage; and a position controller that, when executing a positioning operation, maintains the command d-axis current at a constant value and the command q-axis current at zero, and that controls the control phase angle based on a difference between a target stop rotational position and a rotational position detected by the rotational position detector (positioning control by phase control: current control type).

In another aspect, a motor control unit is provided with a position controller that, when executing a positioning operation, maintains a command d-axis voltage at a constant value and a command q-axis voltage at zero, and that controls a control phase angle based on a difference between the target stop rotational position and a rotational position detected by the rotational position detector (positioning control by phase control: voltage control type).

According the above described motor control unit, the d-axis current/voltage component is constant and the q-axis current/voltage component is set at zero, and the control phase is directly controlled based on position error, thereby allowing position resolution to be improved to the same level as the high resolution of the control phase.

In another aspect, a motor control unit is provided with a position controller that, when executing a positioning operation, maintains the command d-axis current at a constant value, and the command q-axis current at zero, and the control phase angle at a constant value, and that obtains a voltage correction value of each phase based on a difference between a target stop rotational position and a rotational position detected by the rotational position detector to correct the three phase command voltage by the voltage correction value (positioning control by phase voltage correction: current control type).

Yet, in another aspect, a motor control unit is provided with a position controller that, when executing a positioning operation, maintains the command d-axis voltage at a constant value, and the command q-axis voltage at zero, and the control phase angle at a constant value, and that obtains a voltage correction value of each phase based a difference between a target stop rotational position and a rotational position detected by the rotational position detector to correct the three phase command voltage by the voltage correction value (positioning control by phase voltage correction: current control type).

According the above described motor control unit, the voltage of each phase of is corrected based on position error under constant d-axis current/voltage component, q-axis current/voltage component set at zero and constant control phase, thereby obtaining small rotational angles corresponding to the voltage correction state of each phase, consequently providing improving position resolution.

BRIEF DESCRIPTION OF THE DRAWINGS

Other objects, features and advantages of the present disclosure will become clear upon reviewing the following description of the embodiments with reference to the accompanying drawings, in which.

FIG. 8 indicates correlation between phase angles and phase voltages to be corrected;

DETAILED DESCRIPTION

Embodiments of the present disclosure will be described hereinafter with reference to the drawings.

A first embodiment will be described hereinafter with reference to FIGS. 1 to 3.

Figure 1A:
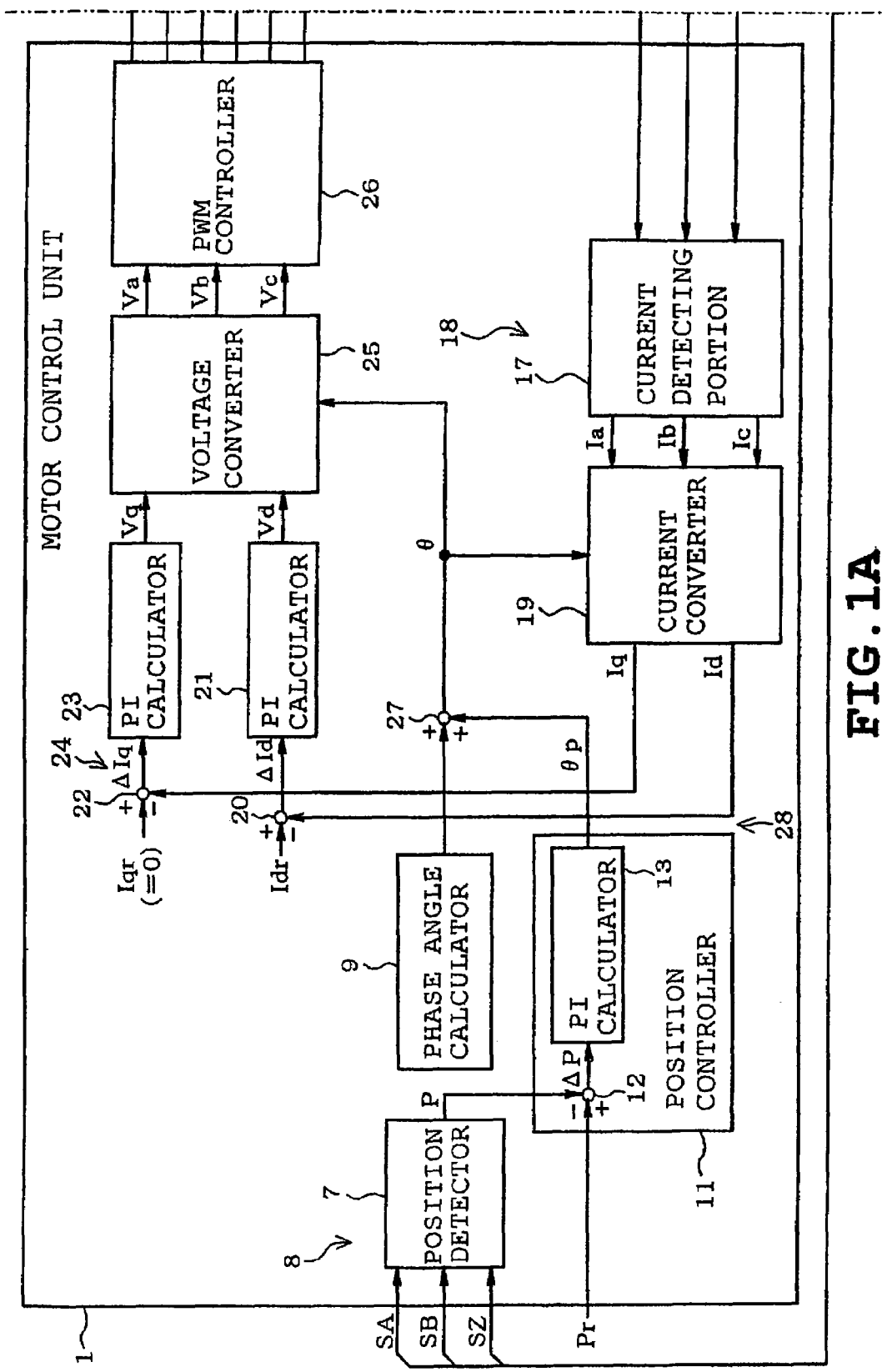
FIG. 1 illustrates a first embodiment of the present disclosure and indicates a system configuration of positioning control by phase control.
Figure 1B:
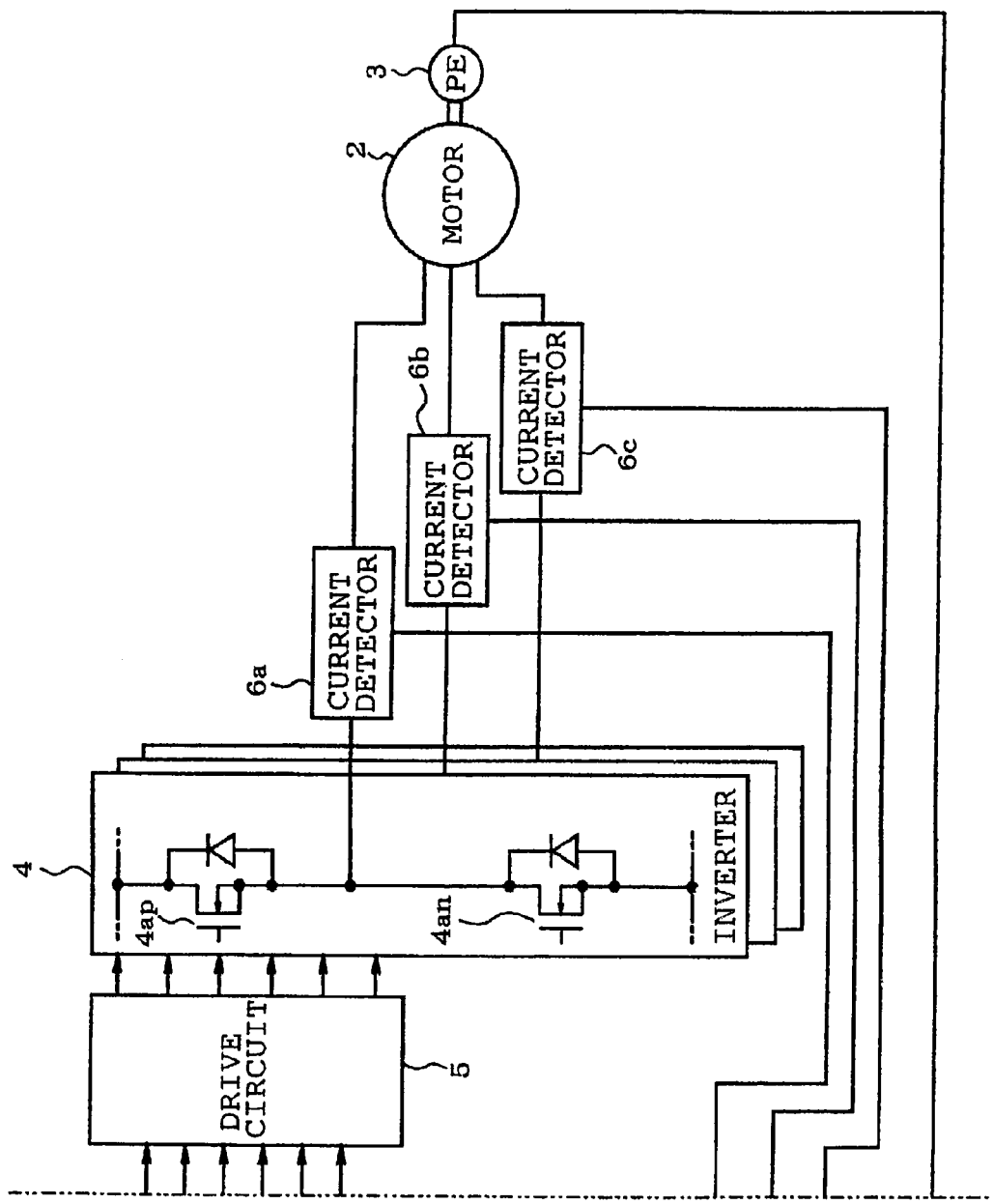
Figure 2A:
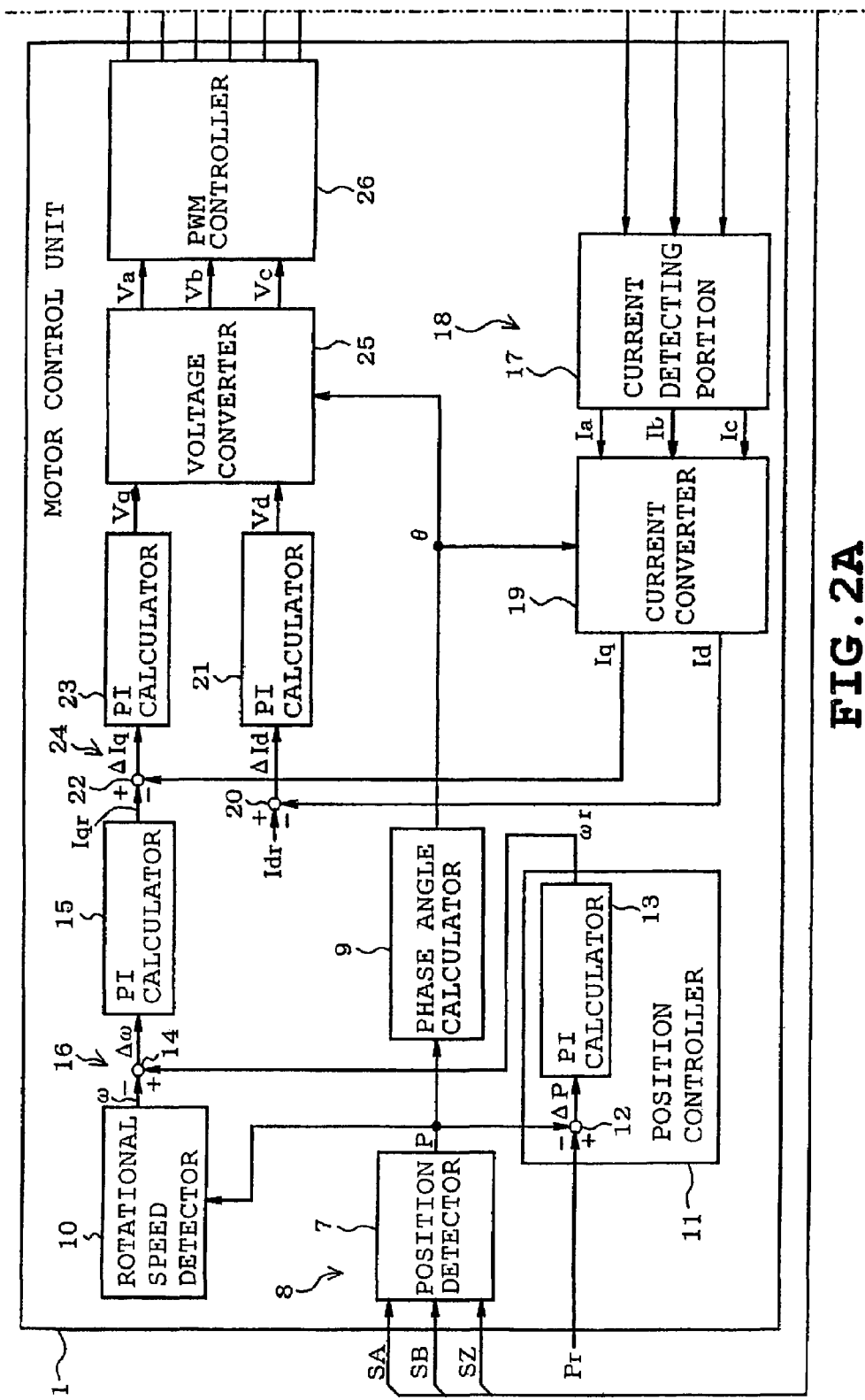
FIG. 2 indicates a system configuration of positioning control by speed control.
Figure 2B:
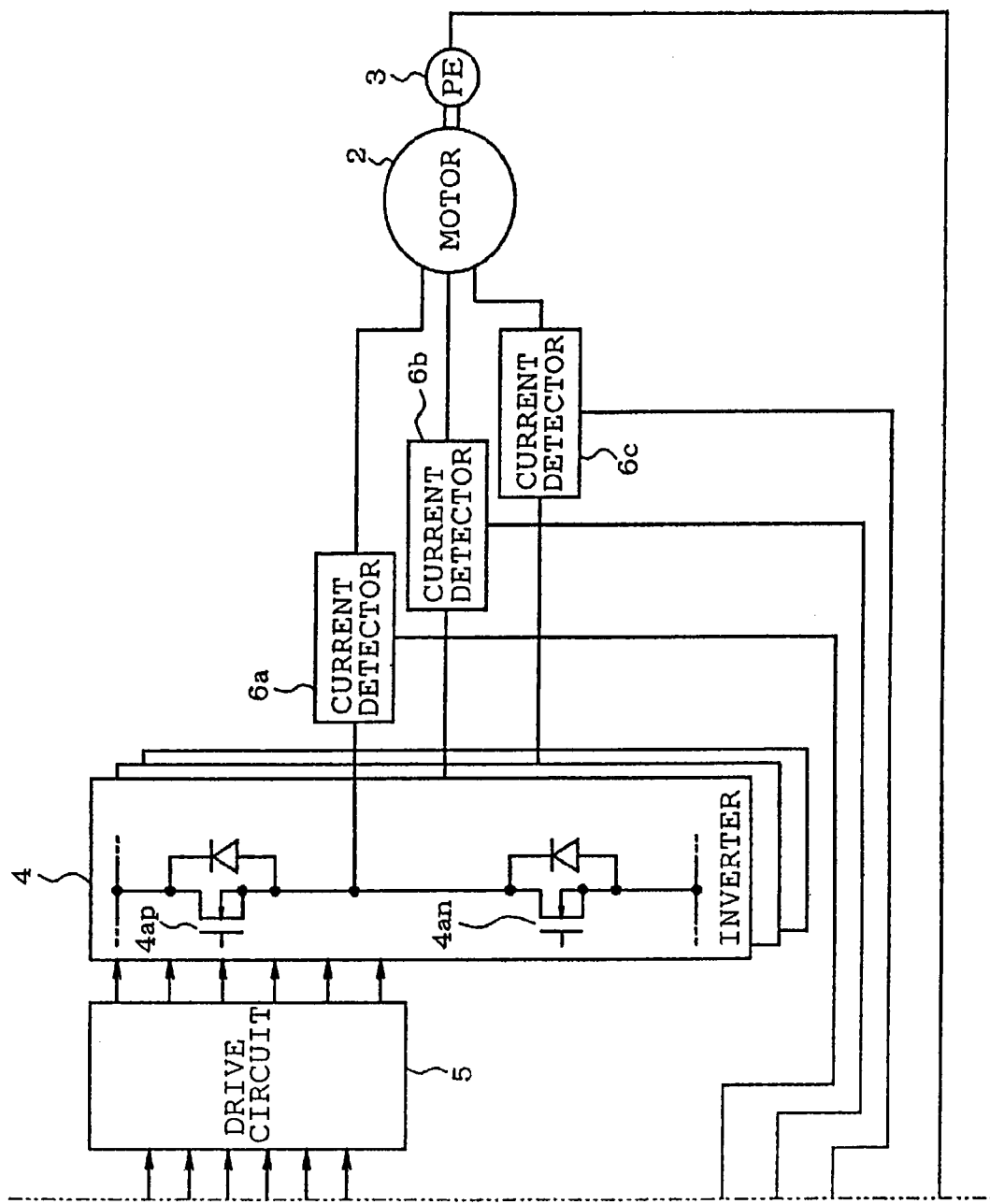

FIGS. 1 and 2 illustrates a system configuration of a motor control system. When position error $\Delta P$ is large, in accordance with the conventional configuration illustrated in FIG. 2, a motor control unit 1 employs a position feed back loop that obtains command rotational speed $\omega r$ based on the position error $\Delta P$ as a major loop and employs speed feed back loop that obtains command current based on speed error $\Delta \omega$ as a minor loop (Such mode of control will be referred to as positioning control by speed control hereinafter). As opposed to this, when position error $\Delta P$ takes a predetermined value or lower, the speed feedback loop is invalidated to arrange the command current at a constant value as illustrated in FIG. 1, under which state the position feed back loop is employed that controls control phase angle $\theta$ (hereinafter referred to as phase angle $\theta$) based on position error $\Delta P$ (such mode of control will be referred to as positioning control by phase control).

First, a description will be given on the configuration of control illustrated in FIG. 2. A brushless DC motor 2 (hereinafter referred to as a motor 2) which is the object of control is a hollow, coreless motor having 24-poles and is used in rotary mechanisms in a laser surveying device for scanning laser beams. A high-resolution (4,194,304 pulses/rev, for example) encoder 3 is mounted on the motor 2 and the output signals SA, SB, and SZ of the encoder 3 is delivered to the motor control unit 1. The encoder 3 of the above example has an angle resolution of approximately 0.3["] per pulse.

The motor 2 is driven by a well-known voltage type inverter 4 constituted by connecting six switching elements such as FET 4ap, 4an . . . to a 3-phase bridge configuration. A commutating signal (described afterwards) outputted from the motor control unit 1 is delivered to each gate of FET 4ap, 4an . . . via a drive circuit 5. Also, current detectors 6a, 6b, and 6c such as hall CT is provided on each output line connecting the inverter 4 and each phase terminal of the motor 2.

The motor control unit 1 is configured by basic components such as CPU and memory; an A/D converter; a processor provided with peripheral circuits such as timers having PWM calculation functionalities; and the like. The motor control unit 1 controls the motor 2 by executing control programs stored in a nonvolatile memory such as a flash memory. FIGS. 1 and 2 illustrate the processing executed by the motor control unit 1 in a block diagram. The motor control unit 1 executes the so called field oriented control on a dq coordinate axis, the d-axis indicating the axial direction of magnetic flux and, the q-axis indicating the axial direction of torque perpendicular to the d-axis.

A position detector 7 constitutes the rotational position detector 8 along with the aforementioned encoder 3 and detects position P which is the absolute rotational angle of the rotor of motor 2 based on the output signals SA, SB, and SZ delivered from the encoder 3. A phase angle calculator 9 operating as a control phase angle generator obtains phase angle $\theta$ as an electric angle by multiplying the detected position P with the number of pole pairs (12 in the above motor) of the motor 2.

A rotational speed detector 10 operating as the rotational speed detector detects rotational speed $\omega$ based on detected position P. A position controller 11 is composed of a subtractor 12 and a PI calculator 13 and generates command rotational speed $\omega r$ by PI calculation after obtaining position error $\Delta P$ by subtracting detection position P from a target rotation stop position Pr (hereinafter referred to as command position Pr). When calculating position error $\Delta P$, a limiting process is executed to prevent overflow.

A subtractor 14 obtains speed error $\Delta \omega$ by subtracting a detected rotational speed $\omega$ from the command rotational speed $\omega r$. A PI calculator 15 generates a command q-axis current Iqr by executing PI calculation with respect to speed error $\Delta \omega$. The subtractor 14 and the PI calculator 15 constitute a speed controller 16. Of note is that a constant value is applied for command d-axis current Idr.

A current detector 17 composed of A/D converter, and the like, constitute a current detector 18 along with the above current detectors 6a, 6b and 6c and obtains 3-phase current Ia, Ib, and Ic based on signals outputted from the current detectors 6a, 6b, and 6c. A current converter 19 operating as a coordinate transformer executes 3-phase to 2-phase transformation and rotational coordinate transformation using phase angle $\theta$ on the 3 phase currents Ia, Ib, and Ic to obtain a detected d-axis current Id and a detected q-axis current Iq.

A subtractor 20 obtains d-axis current error $\Delta Id$ by subtracting the detected d-axis current Id from the command d-axis current Idr. The PI calculator 21 executes PI calculation with respect to the d-axis current error $\Delta Id$ to generate a command d-axis voltage Vd. Similarly, a subtractor 22 obtains q-axis current error $\Delta Iq$ by subtracting the detected q-axis current Iq from the command q-axis current Iqr. The PI calculator 23 executes PI calculation with respect to the q-axis current error $\Delta Iq$ to generate a command q-axis voltage Vq. The subtractors 20 and 22, and PI calculators 21 and 23 constitute the current controller 24.

A voltage converter 25 operating as a coordinate transformer executes 2-phase to 3-phase conversion and rotational coordinate transformation by using phase angle $\theta$ with respect to d-axis voltage Vd and q-axis voltage Vq to obtain 3-phase voltages Va, Vb, and Vc. A PWM controller 26 operating as conductive signal generator executes PWM calculation with respect to phase voltages Va, Vb, and Vc by using a dedicated timer to generate a commutating signal (3-phase conductive signal).

On the other hand, in the positioning control carried out by phase control indicated in FIG. 1, rotational speed detector 10 and speed controller 16 are stopped. Also, the phase angle calculator 9 stops the multiplication process on the aforementioned number of pole pairs and maintains and outputs phase angle $\theta$ at the time of switching from the positioning control (FIG. 2) by speed control to the positioning control (FIG. 1) by phase control. The PI calculator 13 of the position controller 11 generates corrected angle $\theta p$ by executing PI calculation with respect to the position error $\Delta P$. The accumulator 27 generates a corrected phase angle $\theta$ by adding corrected angle $\theta p$ to the phase angle $\theta$ outputted from the phase angle calculator 9 at the time of switching. The position controller 11 and the accumulator 27 constitute the position controller 28.

Next, the operation of the present embodiment will be described with reference to the flowchart indicated in FIG. 3.

Figure 3:
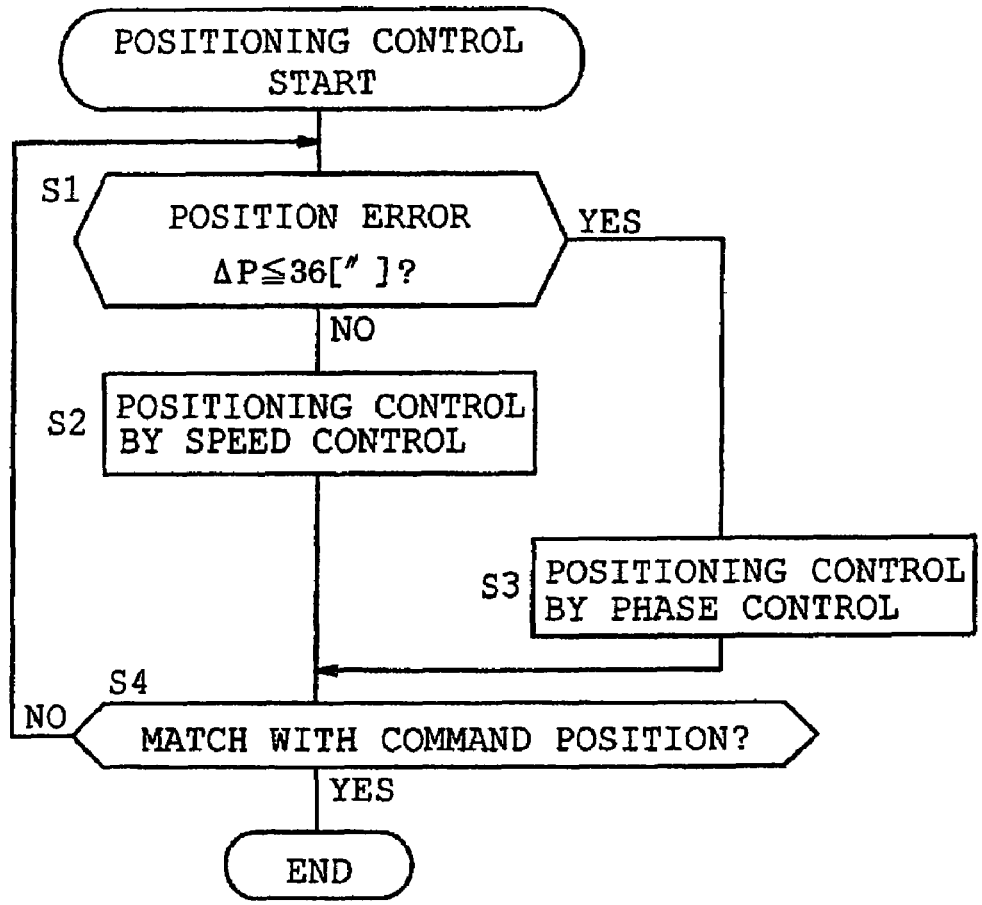
FIG. 3 indicates a flowchart of positioning control.

Upon input of positioning command, the motor control unit 1 starts positioning control indicated in FIG. 3. In the positioning control, the method of control is switched based on the position error ΔP, in other words, the remaining amount of movement until reaching the command position Pr from the current position P. For example, in case command position Pr is set at an angular position of 180[°] from the position at the time of start of positioning control for position inversion, the motor control unit 1 determines whether or not the position error ΔP (angle) is 36["] or less (step S1) and if not, positioning control by speed control by the configuration indicated in FIG. 2 is executed (steps S2: a first control mode).

This positioning control by speed control validates the position feedback loop that generates command rotational speed ωr based on position error ΔP and the speed feed back loop that generates command q-axis current Iqr based on speed error Δω as initially described. The command d-axis current Idr is constant. Thus, the command rotational speed ωr increases in proportion to the increase in position error ΔP, consequently increasing q-axis current Iq and q-axis voltage Vq. Thus, high torque and high responsiveness can be obtained and rotation can be made to the proximity of the command position Pr in a short period of time. However, resolution of voltage swing of the PWM controller 26 at the processor is relatively low; and the intervention of the speed feedback loop increases the difficulty in achieving high-precision positioning.

As opposed to this, in case the motor control unit 1 determines that the position error is ΔP (angle) is 36["] or lower (YES), positioning control by way of phase control in the configuration illustrated in FIG. 1 is executed (step S3: second control mode). In the positioning control, the speed control is stopped, the command d-axis current Idr remains constant, and the command q-axis current Iqr is set at 0. Then, the phase angle calculator 9 maintains the phase angle at the time the switch is made to the positioning control by the phase control and validates the position feedback loop that corrects the phase angle θ based on the position error ΔP.

In this case, the processor executes the following limiting process to prevent overflow in the multiplication of the following 16 bits in its functionality as a subtractor 12 of the position controller 11. Of note is that S_PreSet_dev32 is a variable indicating the position error ΔP, and S_temp is a temporary variable.

```
If (S_PreSet_dev32>0x00007fff)
    S_temp=0x7fff
Else if (S_PreSet_dev32<0xffff8000)
    S_temp=0x8000
Else
    S_temp=lower 16 bits of S_Preset_dev32
```

Subsequently, the processor calculates corrected angle θp (variable S_phase_user) based on position error of 16 bits in accordance with the following equation in its functionality as the PI calculator 13. PhaKp and PhaKi are variables indicating proportional gain and integral gain of phase correction positioning control respectively, and S_phase_user_I is a variable indicating integral term. The first equation performs integral calculation and the second equation performs addition of integral calculation result and proportional calculation result. As well known in the art, (n) indicates digital control period.

$$S\_phase\_user\_I(n) = S\_phase\_user\_I(n-1) + PhaKi \times S\_temp$$

$$S\_phase\_user(n) = S\_phase\_user\_I(n) + PhaKp \times S\_temp$$

The processor provides limitation in phase angle for the calculated S_phase_user. Then, the processor, in its functionality as the accumulator 27, calculates the phase angle θ (variable R_theta_com) in accordance with the following equation by defining a variable corresponding to the phase angle θ when the switch is made to the positioning control by phase control as S_theta_Lock.

$$R\_theta\_com = S\_theta\_Lock + S\_phase\_user$$

The above described positioning control by phase control has no intervention of the speed feedback loop and the command d-axis current Idr and the command q-axis current Iqr are fixed. Thus, no voltage variation and consequently torque variation induced by speed feedback loop is unlikely to occur. Generally, digital data resolution of phase angle θ can be arranged higher than the resolution of voltage swing at PWM controller 26 (timer), thereby further facilitating the control of small torque by restraining generated torque by controlling the q-axis current Iq at 0. As a result, though less responsive compared to the aforementioned positioning control by speed control, high-precision positioning control can be achieved.

The motor control unit 1 determines whether or not the current position P has reached the command position Pr (inversion position) when processing of the above described step S2 or S3 is completed. The process proceeds to S1 if the current position P does not match (NO) with the command position Pr (inverted position) and completes the positioning control if the current position P matches (YES) with the command position Pr.

As described above, the motor control unit 1 of the present embodiment executes positioning control by phase control that directly controls the phase angle θ based on position error ΔP when the position error ΔP is takes a predetermined value or lower, thereby allowing high-precision positioning in the proximity of the command position Pr. Also, in case the position error ΔP is greater than the predetermined value, positioning control by speed control is executed, thereby improving the overall responsiveness and efficiency.

Next, a second embodiment of the present disclosure will be described with reference to FIGS. 4 and 5.

Figure 4:
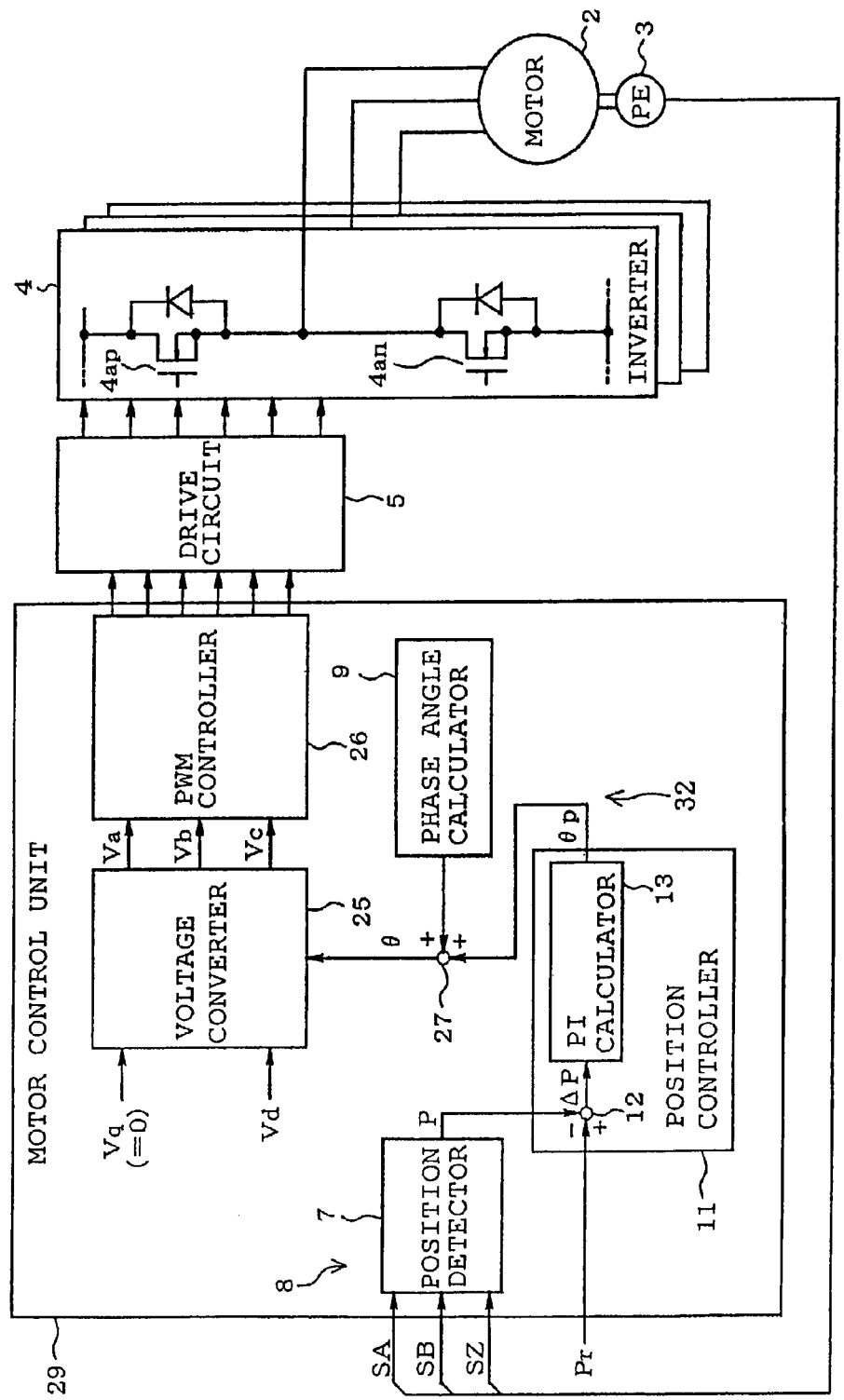
FIG. 4 illustrates a second embodiment of the present disclosure and corresponds to FIG. 1.
Figure 5A:
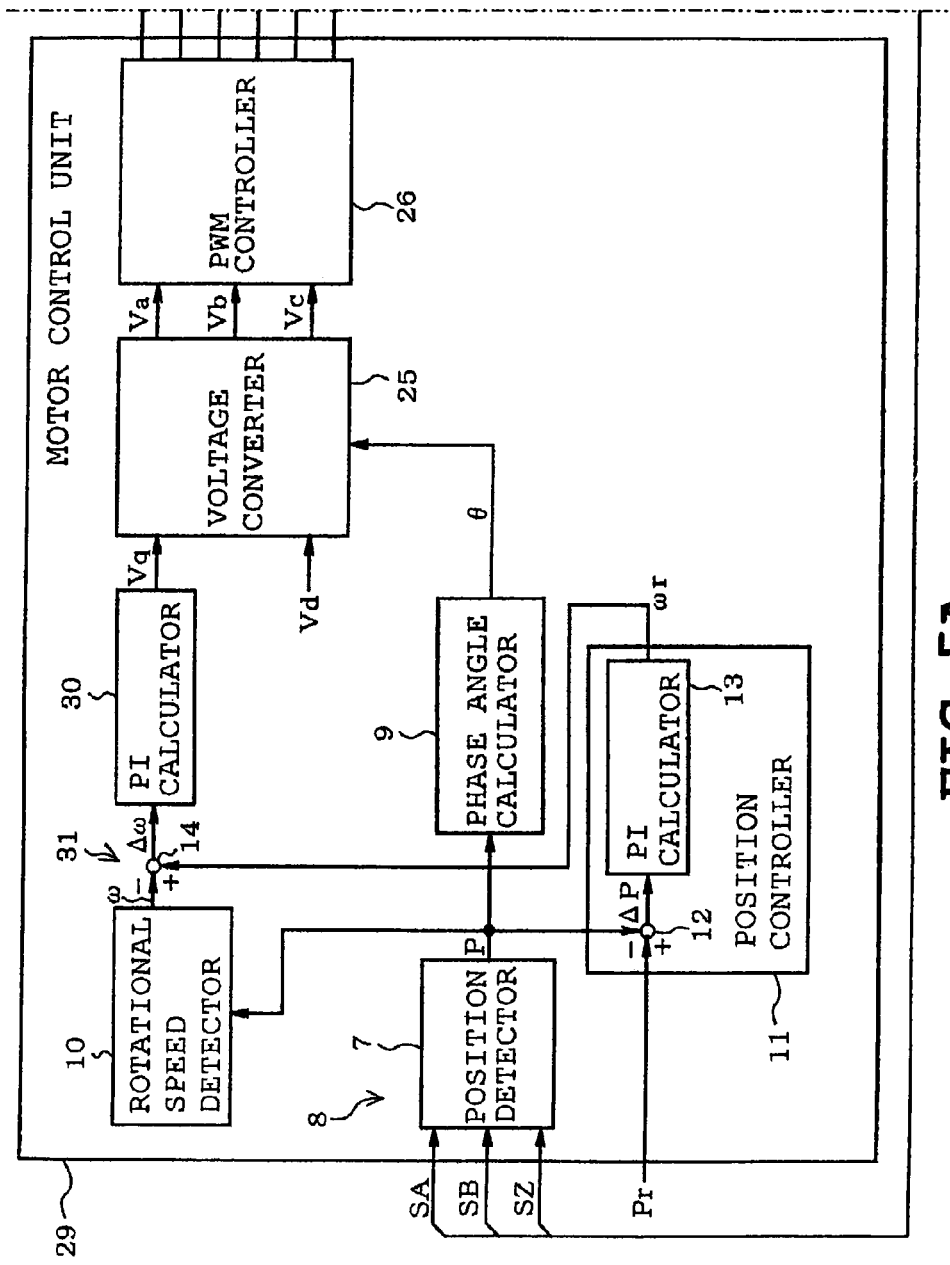
FIG. 5 corresponds to FIG. 2.
Figure 5B:
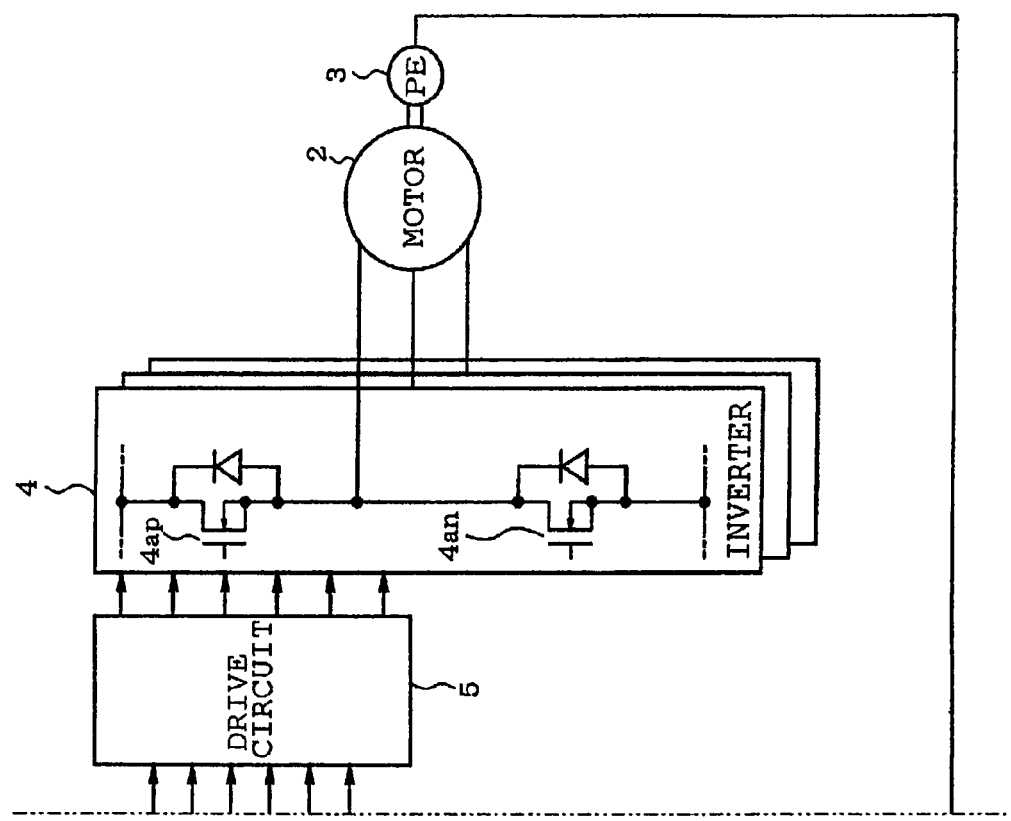

FIGS. 4 and 5 illustrate a system configuration of a motor control system and portions that are identical to the FIGS. 1 and 2 are identified with the same reference symbols. The motor control unit 29 differs from the first embodiment in that voltage is controlled directly without current control loop.

When position error ΔP is large, the motor control unit 29 also employs position feed back loop that obtains command rotational speed ωr based on position error ΔP as illustrated in FIG. 5, and employs speed feedback loop that obtains q-axis voltage Vq based on speed error Δω (positioning control by speed control). The PI calculator 30 generates command q-axis voltage Vq by executing PI calculation with respect to speed error Δω, and constitutes the speed controller 31 along with the subtractor 14. Of note is that d-axis voltage Vd is constant.

When position error ΔP is reduced, speed feedback loop is invalidated as illustrated in FIG. 4, and the position feed back loop is employed that controls phase angle θ based on position error ΔP (positioning control by phase control) by rendering the d-axis voltage Vd constant and setting the q-axis voltage Vd at 0. In this case, a position controller 32 is constituted by the position controller 11 and the accumulator 27.

The positioning control using the motor control unit 29 is also executed in accordance with the process similar to the first embodiment and obtains a similar operation and effect. Also, since the current feedback loop has been eliminated, voltage variation and consequently torque variation originating from the loop does not occur, which in turn allows positioning of higher precision than the first embodiment.

Next, a third embodiment will be described with reference to FIGS. 6 to 9.

Figure 6A:
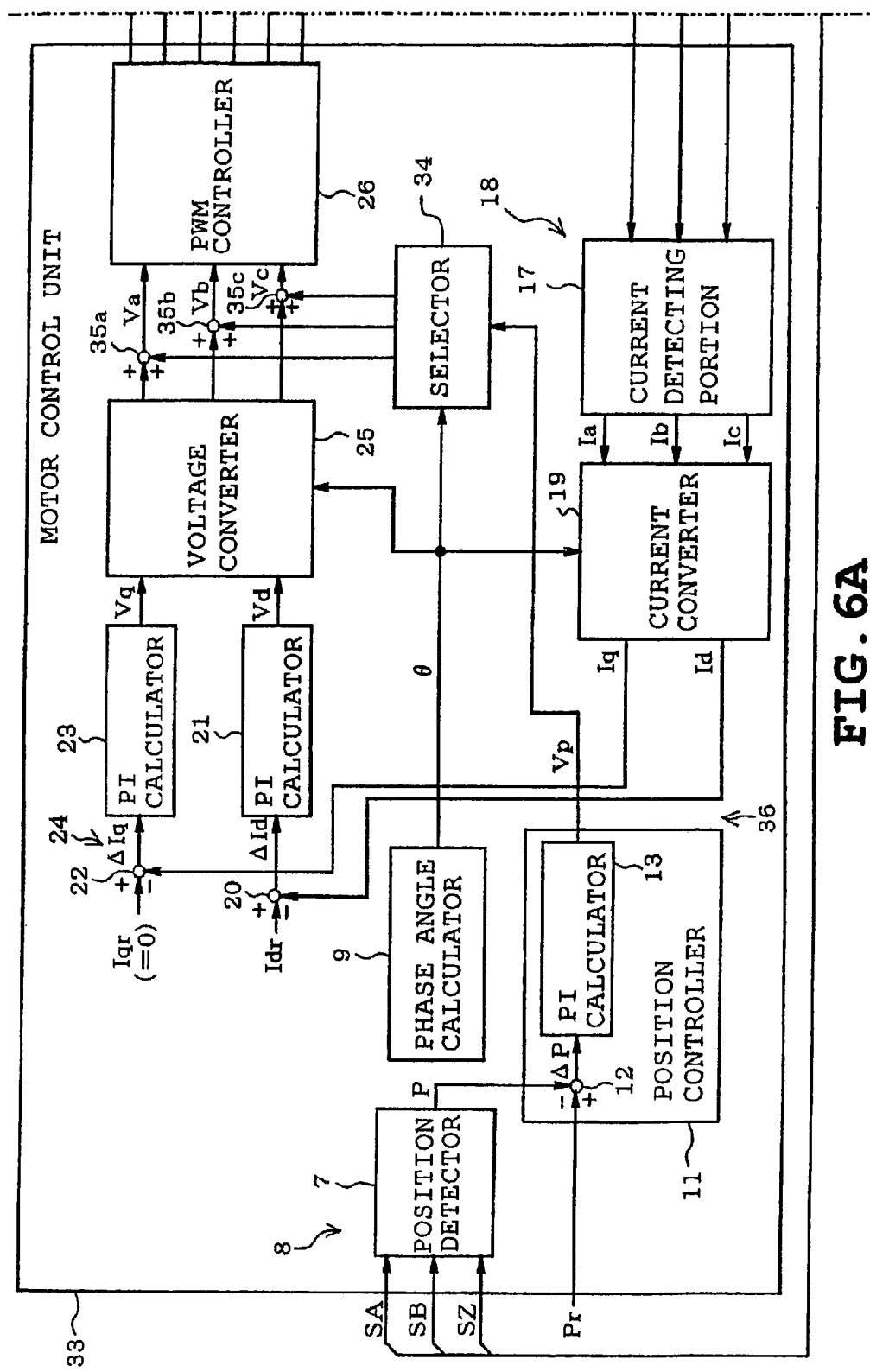
FIG. 6 illustrates a third embodiment of the present disclosure and indicates a system configuration of positioning control by phase voltage correction.
Figure 6B:
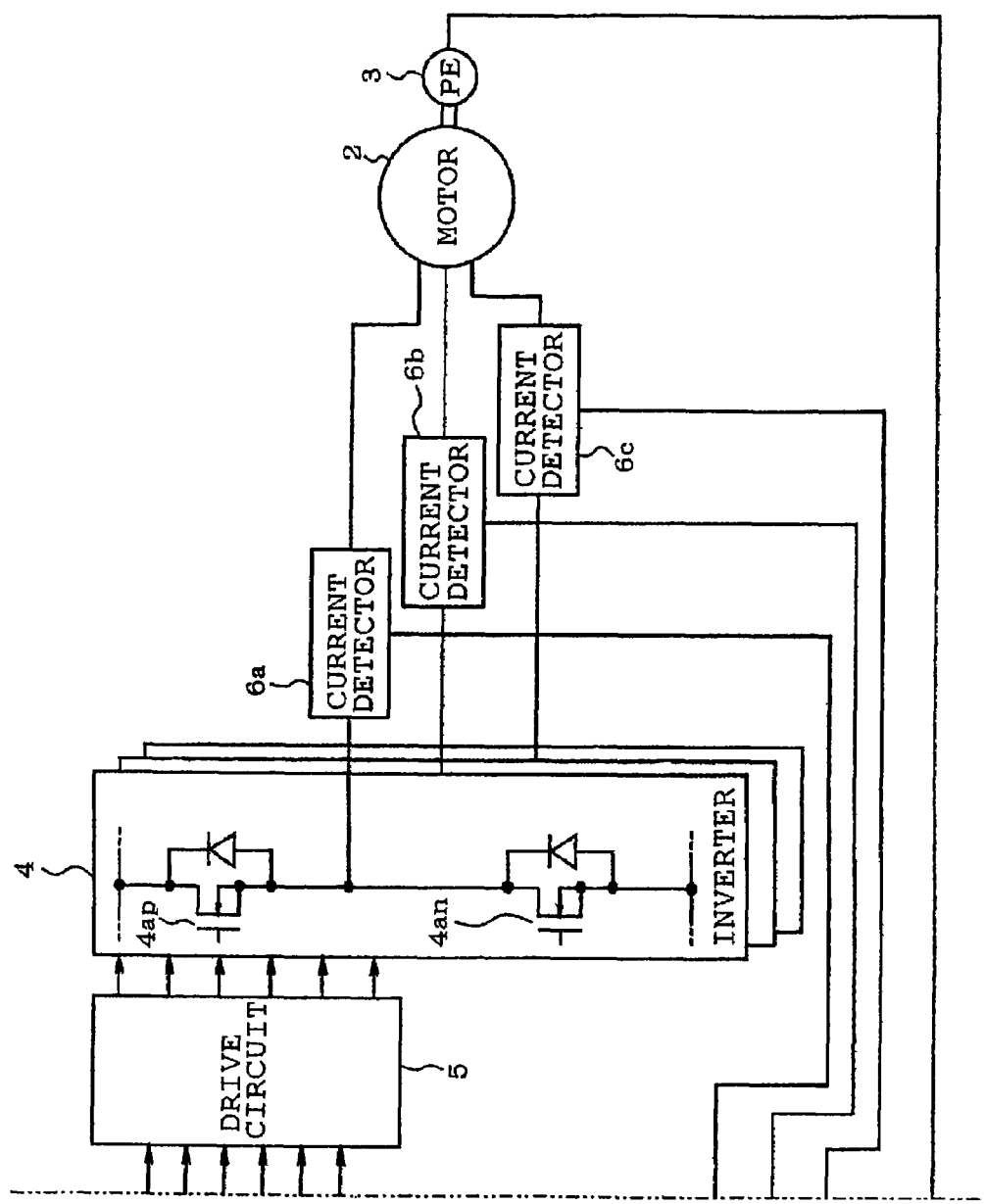

FIG. 6 illustrates a system configuration of a motor control system and portions that are identical to the FIG. 1 are identified with the same reference symbols. When position error ΔP is large, the motor control unit 33 executes positioning control by speed control by the configuration identical to FIG. 2, and when position error ΔP is reduced, employs position feedback loop (this control mode is referred to as positioning control by phase voltage correction hereinafter) that executes correction control on phase voltages Va, Vb, and Vc based on position error ΔP by using the configuration indicated in FIG. 6.

When switched to the positioning control by phase voltage correction, rotational speed detector 10 and speed controller 16 are stopped. Also, the phase angle calculator 9 stops the multiplication process of the above described number of pole pairs and maintains and outputs phase angle θ at the time of switching the positioning control. The PI calculator 13 of the position controller 11 generates phase voltage corrected value Vp by executing PI calculation with respect to position error ΔP.

The selector 34 selects a phase (a phase, b phase, and c phase) to execute phase voltage correction based on phase angle θ and a direction of correction (polarity), and outputs phase voltage corrected value Vp at predetermined polarity relative to the selected phase (refer to FIG. 8). Accumulators 35a, 35b, and 35c add phase voltages Va, Vb, and Vc outputted from a voltage converter 25 respectively and the phase voltage corrected value Vp outputted from the selector 34. The position controller 11, the selector 34, and the accumulators 35a, 35b, and 35c constitute a position controller 36.

Figure 7:
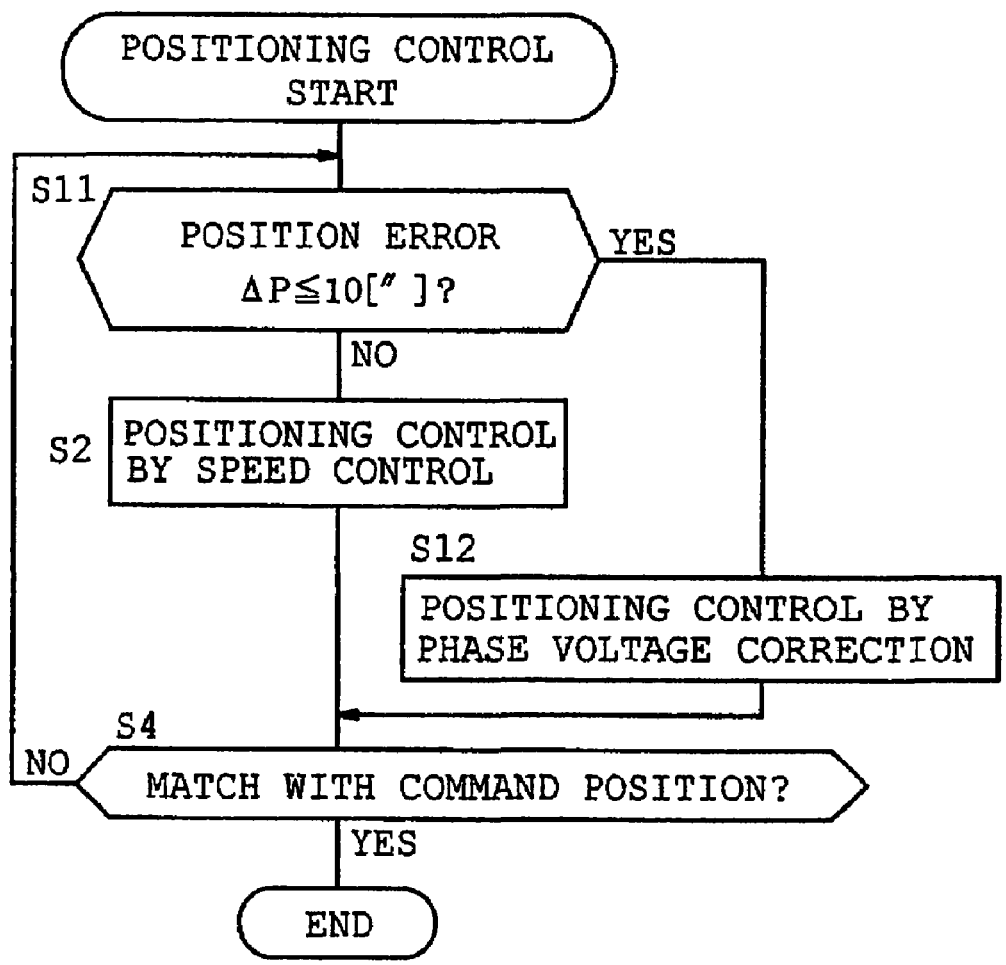
FIG. 7 corresponds to FIG. 3.

FIG. 7 indicates a flowchart of a positioning control and processing steps that are identical to each processing step indicated in FIG. 3 are identified with the same step numbers. When the command position Pr is set at an angular position of 180[°] from the start of the positioning control for position inversion, the motor control unit 33 determines whether or not the position error ΔP is 10 ["] or less (step S11), and if "Yes", positioning control by phase voltage correction is executed (step S12: second control mode). The positioning control stops the speed control as described earlier, maintains a constant command d-axis current Idr, and sets the command q-axis current Iqr at zero. The phase angle calculator 9 maintains the phase angle θ at the time the switch is made to this positioning control, and validates the position feedback loop that executes correction control on either of the phase voltages Va, Vb, or Vc based on the position error ΔP.

In this case, the processor, in its functionality as the PI calculator 13, executes a limiting process similar to the first embodiment, and calculates the phase voltage corrected value Vp (variable S_phase_userM20) based on the following equation from the 16 bit position error. PhaM20 Kp and PhaM20Ki are variables indicating proportional gain and integral gain of phase voltage correction positioning control respectively and S_phase_userM20_I is a variable indicating integral term. The first equation performs integral calculation and the second equation performs addition of integral calculation result and proportional calculation result.

$$S\_phase\_userM20\_I(n) = S\_phase\_userM20\_I(n-1) + PhaM20Ki \times S\_temp$$

$$S\_phase\_userM20(n) = S\_phase\_userM20\_I(n) + PhaM20Kp \times S\_temp$$

Figure 9:
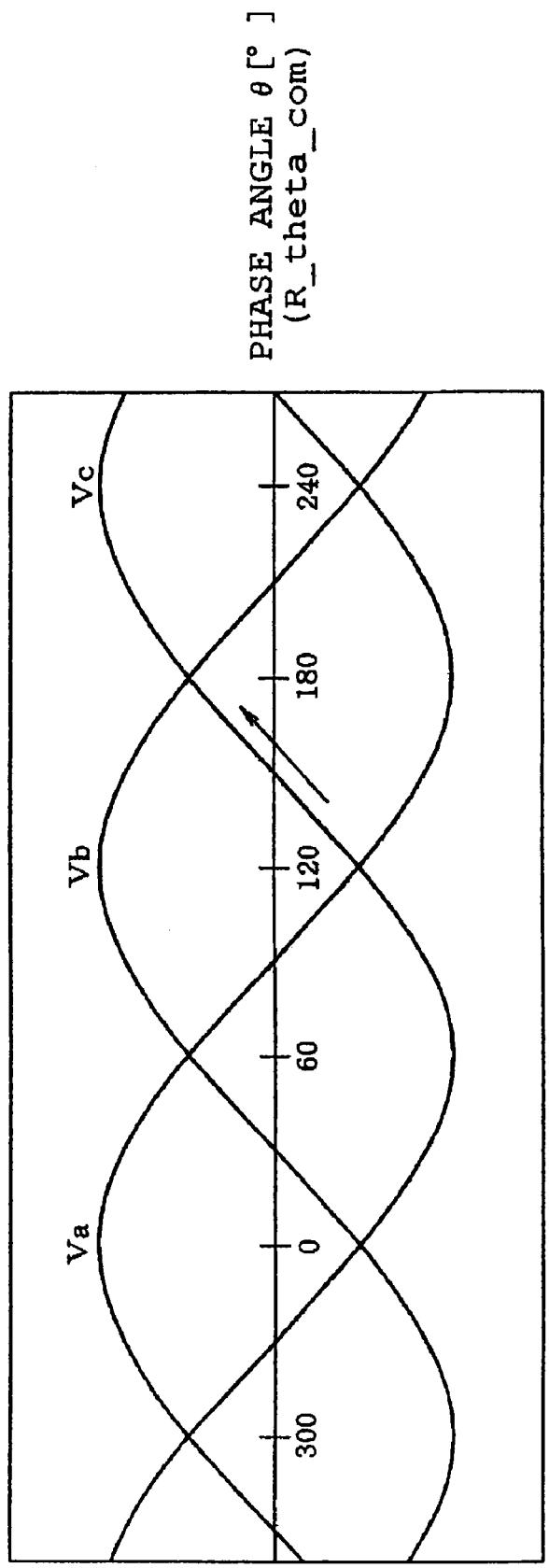
FIG. 9 describes the basis of correlation indicated in FIG. 8.

The processor provides limitation in phase voltage correction amount on the calculated S_phase_userM20. Then, the selector 34, divides the electrical angle of 360[°] into six angular regions of 60[°] as illustrated in FIG. 8 and corrects one predetermined phase voltage based on the angular region to which the phase angle θ (variable R_theta_com) belongs. FIG. 9 describes the basis of correlation indicated in FIG. 8. For instance, when the phase angle θ falls under the angular region of 120[°] to 180[°], the c-phase voltage Vc is increased by positive rotation of the motor 2, in other words, increase in phase angle θ. The a-phase voltage Va and the b-phase voltage Vb are maintained at the value outputted from the voltage converter 25, and the c-phase voltage Vc is corrected by phase voltage correction value Vp (variable S_phase_userM20) of positive polarity. As a result, the motor 2 is rotated in the positive direction for a small angle corresponding to the phase voltage correction value Vp. The same is applicable to other angular regions.

The positioning control by phase voltage correction does not involve speed feedback loop and maintains constant command d-axis current Idr and command q-axis current Iqr. Thus, voltage variation and consequently torque variation originating from speed feedback loop is less prone to occur. Since a predetermined phase voltage is corrected directly, control of rotation in small angles is allowed though slight distortion occurs in the three-phase analog current applied on the motor 2, thereby allowing positioning control of high precision as compared to the positioning control by speed control. Also, since positioning control by speed control is executed when the position error ΔP is greater than the predetermined value, responsiveness efficiency can be improved as a whole.

Next, a fourth embodiment of the present disclosure will be described with reference to FIG. 10.

Figure 10:
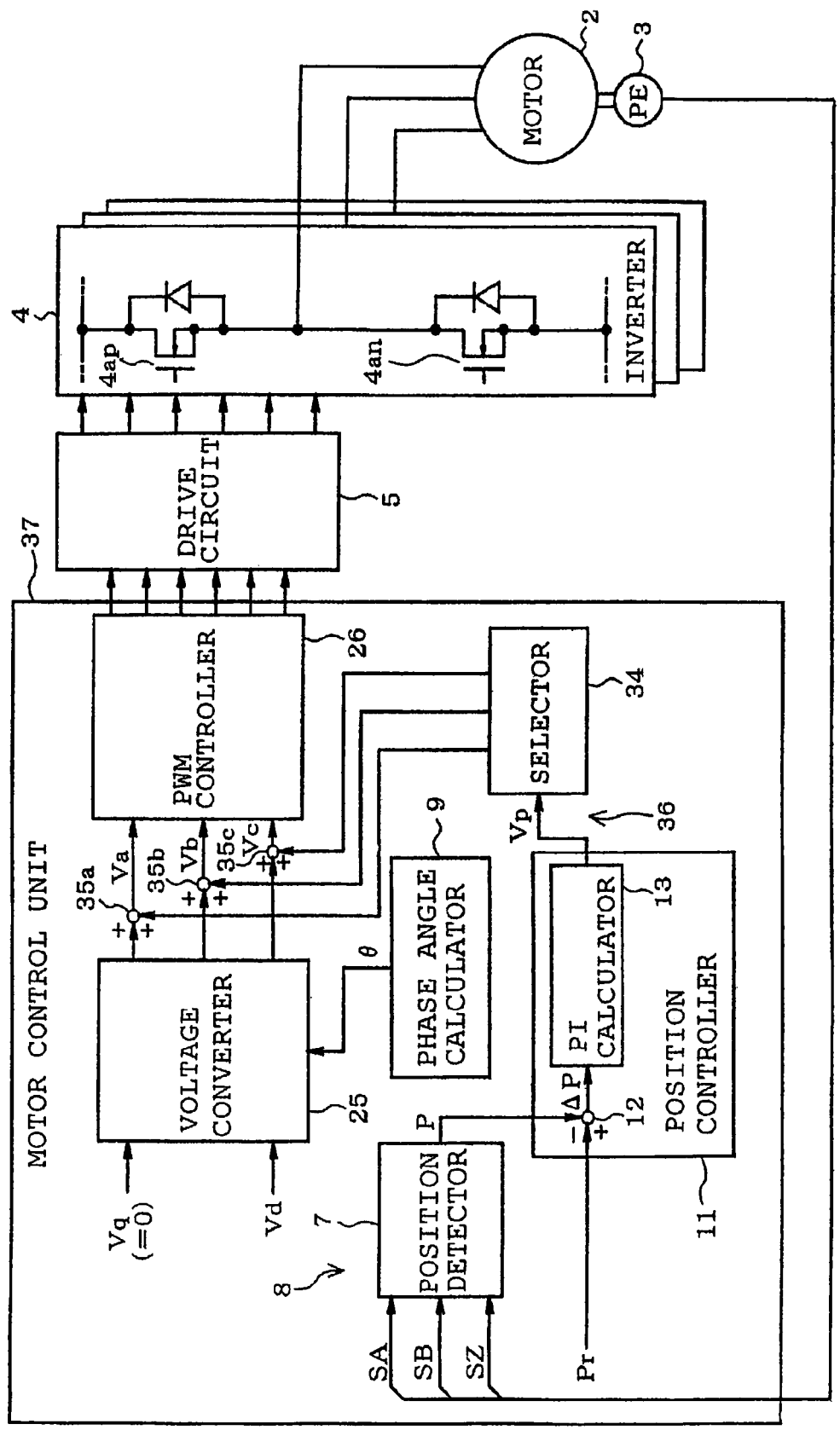
FIG. 10 illustrates a fourth embodiment of the present disclosure and corresponds to FIG. 6.

FIG. 10 indicates a system configuration of a motor control system and differs from a third embodiment indicated in FIG. 6 in that no current control loop is involved.

This motor control unit 37 executes positioning control by speed control by the configuration indicated in FIG. 5 when position error ΔP is large, and when position error ΔP is small, speed feedback loop is invalidated as indicated in FIG. 10, and positioning control by phase voltage correction is executed by correcting phase voltages Va, Vb, and Vc based on position error ΔP with the d-axis voltage Vd maintained constant, and the q-axis voltage Vq set at zero.

The positioning control using the motor control unit 37 is also executed in accordance with the process similar to the third embodiment and obtains a similar operation and effect. Also, since the current feedback loop has been eliminated, voltage variation and consequently torque variation originating from the loop does not occur, allowing positioning of higher precision than the third embodiment.

A fifth embodiment of the present disclosure will be described hereinafter. A motor control unit of the present embodiment executes positioning control while switching between a first, a second, and a third control mode illustrated in FIGS. 2, 1 and 6 depending upon the size of the position error ΔP in case the current feed back loop is involved; whereas when no current feed back loop is involved, positioning control is executed while switching between a first, a second, and a third control mode illustrated in FIGS. 5, 4 and 10 depending upon the size of the position error ΔP.

Figure 11:
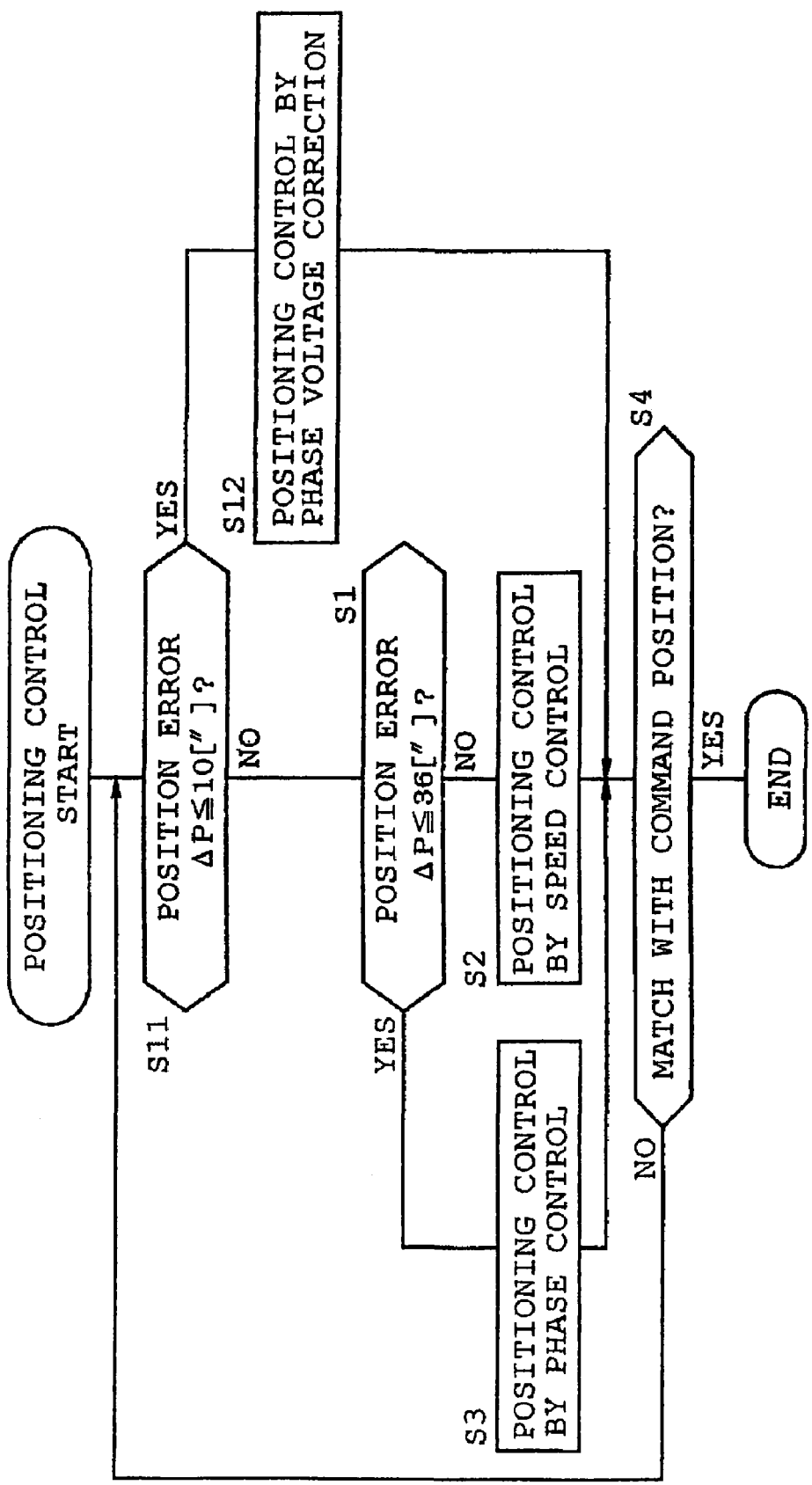
FIG. 11 illustrates a fifth embodiment of the present disclosure and corresponds to FIG. 3.

FIG. 11 indicates a flowchart applicable to both of the above cases and process steps that are identical to each process step indicated in FIGS. 3 and 7 are identified with the same step number. That is, when the position error ΔP is greater than the first threshold value of 36["], positioning control by speed control indicated in FIG. 2 or 5 is executed. When position error ΔP is greater than 10["] and equal to or less than 36["], positioning control by phase control indicated in FIG. 1 or 4 is executed. Further, when the position error ΔP is equal to or less than 10["], positioning control by phase voltage correction indicated in FIG. 6 or 10 is executed.

According to the present embodiment, since a switch is made sequentially to a positioning control that is capable of positioning in smaller angles as the position error ΔP becomes smaller, high responsiveness and high-precision positioning control can be obtained.

The present disclosure is not limited to the above described and illustrated embodiments but may be modified or expanded as follows.

Each embodiment describes a configuration in which the positioning control is switched between speed control and other controls. However, positioning control consisting of phase control only or phase voltage correction only may be executed. Also, the positioning control may be executed by switching between the positioning control by phase control and the positioning control by phase voltage correction.

The command q-axis current Iqr or the command q-axis voltage Vq has been set at zero in the positioning control by phase control and the positioning control by phase voltage correction. However, a constant value other than zero may be employed as long as such value reduces torque to a magnitude that allows subtle torque control in terms of positioning precision.

The foregoing description and drawings are merely illustrative of the principles of the present disclosure and are not to be construed in a limited sense. Various changes and modifications will become apparent to those of ordinary skill in the art. All such changes and modifications are seen to fall within the scope of the disclosure as defined by the appended claims.

What is claimed is:

1. A motor control unit, comprising:
   a rotational position detector that detects a rotational position of a brushless DC motor;
   a current detector that detects a current of the brushless DC motor;
   a coordinate transformer that executes rotational coordinate transformation of the current detected by the current detector by using a control phase angle and that obtains a d-axis current constituting a magnetic flux component and a q-axis current constituting a torque component perpendicular thereto;
   a current controller that generates a command d-axis voltage based on a difference between a command d-axis current and a d-axis current detected by the current detector, and that generates a command q-axis voltage based on a difference between a command q-axis current and a q-axis current detected by the current detector;
   a coordinate transformer that generates a three-phase command voltage by executing rotational coordinate transformation of the command d-axis voltage and the command q-axis voltage by using the control phase angle;
   a conductive signal generator that generates a three-phase conductive signal based on the three-phase command voltage; and
   a position controller that, when executing a positioning operation, maintains the command d-axis current at a constant value and the command q-axis current at zero, and that controls the control phase angle based on a difference between a target stop rotational position and a rotational position detected by the rotational position detector.

2. The motor control unit of claim 1, further comprising a control phase angle generator that generates a control phase angle corresponding to a rotational position detected by the rotational position detector, a rotational speed detector that detects a rotational speed based on a rotational position detected by the rotational position detector, a speed controller that generates a command q-axis current based on a difference between a command rotational speed and a rotational speed detected by the rotational speed detector, and the position controller that, when executing a positioning operation, allows switching between a first control mode that validates the control phase angle generator, the rotational speed detector, and the speed controller, and that generates the command rotational speed based on a difference between the target stop rotational position and a rotational position detected by the rotational position detector; and a second control mode that invalidates the control phase angle generator, the rotational speed detector, and the speed controller, and that maintains the command d-axis current at a constant value and the command q-axis current at zero, and that controls the control phase angle based on a difference between the target stop rotational position and a rotational position detected by the rotational position detector.

3. The motor control unit of claim 2, wherein the position controller is capable of switching to a third control mode, in addition to the first and the second control modes, that invalidates the control phase angle generator, the rotational speed detector, and the speed controller, and that maintains the command d-axis current at a constant value and the command q-axis current at zero, and the control phase angle at a constant value, and that obtains a voltage correction value of each phase based on a difference between the target stop rotational position and a rotational position detected by the rotational position detector to correct the three-phase command voltage by the voltage correction value.

4. The motor control unit of claim 3, wherein the position controller executes positioning by switching sequentially from the first control mode to the second control mode and to the third control mode as a difference between the target stop rotation position and a rotational position detected by the rotational position detector becomes smaller.

5. The motor control unit of claim 2, wherein the position controller executes positioning by switching from the first control mode to the second control mode when a difference between the target stop rotation position and a rotational position detected by the rotational position detector is equal to or less than a predetermined value.

6. A motor control unit, comprising:
   a rotational position detector that detects a rotational position of a brushless DC motor;
   a coordinate transformer that generates a three-phase command voltage by executing rotational coordinate transformation of a command d-axis voltage constituting a magnetic flux component and a command q-axis voltage constituting a torque component perpendicular thereto by using a control phase angle;
   a conductive signal generator that generates a three-phase conductive signal based on the three-phase command voltage; and a position controller that, when executing a positioning operation, maintains the command d-axis voltage at a constant value and the command q-axis voltage at zero, and that controls the control phase angle based on a difference between a target stop rotational position and a rotational position detected by the rotational position detector.

7. The motor control unit of claim 6, further comprising a control phase angle generator that generates a control phase angle corresponding to a rotational position detected by the rotational position detector, a rotational speed detector that detects a rotational speed based on a rotational position detected by the rotational position detector, a speed controller that generates a command q-axis voltage based on a difference between a command rotational speed and a rotational speed detected by the rotational speed detector, and the position controller that, when executing a positioning operation, allows switching between a first control mode that validates the control phase angle generator, the rotational speed detector, and the speed controller, and that generates the command rotational speed based on a difference between the target stop rotation position and a rotational position detected by the rotational position detector; and a second control mode that invalidates the control phase angle generator, the rotational speed detector, and the speed controller, and that maintains the command d-axis voltage at a constant value and the command q-axis voltage at zero, and that controls the control phase angle based on a difference between the target stop rotational position and a rotational position detected by the rotational position detector.

8. The motor control unit of claim 7, wherein the position controller is capable of switching to a third control mode, in addition to the first and the second control modes, that invalidates the control phase angle generator, the rotational speed detector, and the speed controller, and that maintains the command d-axis voltage at a constant value and the command q-axis voltage at zero, and the control phase angle at a constant value, and that obtains a voltage correction value of each phase based a difference between the target stop rotational position and a rotational position detected by the rotational position detector to correct the three-phase command voltage by the voltage correction value.

9. The motor control unit of claim 8, wherein the position controller executes positioning by switching sequentially from the first control mode to the second control mode and to the third control mode as a difference between the target stop rotation position and a rotational position detected by the rotational position detector becomes smaller.

10. The motor control unit of claim 7, wherein the position controller executes positioning by switching from the first control mode to the second control mode when a difference between the target stop rotation position and a rotational position detected by the rotational position detector is equal to or less than a predetermined value.

11. A motor control unit, comprising:
a rotational position detector that detects a rotational position of a brushless DC motor;
a current detector that detects a current of the brushless DC motor;
a coordinate transformer that executes rotational coordinate transformation of the current detected by the current converter by using a control phase angle and that obtains a d-axis current constituting a magnetic flux component and a q-axis current constituting a torque component perpendicular thereto;
a current controller that generates a command d-axis voltage based on a difference between a command d-axis current and a d-axis current detected by the current detector, and that generates a command q-axis voltage based on a difference between a command q-axis current and a q-axis current detected by the current detector;
a coordinate transformer that generates a three-phase command voltage by executing rotational coordinate transformation of the command d-axis voltage and the command q-axis voltage by using the control phase angle;
a conductive signal generator that generates a three-phase conductive signal based on the three-phase command voltage; and
a position controller that, when executing a positioning operation, maintains the command d-axis current at a constant value, the command q-axis current at zero, and the control phase angle at a constant value, and that obtains a voltage correction value of each phase based a difference between a target stop rotational position and a rotational position detected by the rotational position detector to correct the three-phase command voltage by the voltage correction value.

12. The motor control unit of claim 11, further comprising a control phase angle generator that generates a control phase angle corresponding to a rotational position detected by the rotational position detector, a rotational speed detector that detects a rotational speed based on a rotational position detected by the rotational position detector, a speed controller that generates a command q-axis current based on a difference between a command rotational speed and a rotational speed detected by the rotational speed detector, and the position controller that, when executing a positioning operation, allows switching between a first control mode that validates the control phase angle generator, the rotational speed detector, and the speed controller; and that generates the command rotational speed based on a difference between the target stop rotation position and a rotational position detected by the rotational position detector; and a second control mode that invalidates the control phase angle generator, the rotational speed detector, and the speed controller, and that maintains the command d-axis current at a constant value and the command q-axis current at zero, and the control phase angle at a constant value, and that obtains a voltage correction value of each phase based on a difference between the target stop rotational position and a rotational position detected by the rotational position detector to correct the three-phase command voltage by the voltage correction value.

13. The motor control unit of claim 12, wherein the position controller executes positioning by switching from the first control mode to the second control mode when a difference between the target stop rotation position and a rotational position detected by the rotational position detector is equal to or less than a predetermined value.

14. A motor control unit, comprising:
a rotational position detector that detects a rotational position of a brushless DC motor;
a coordinate transformer that generates a three-phase command voltage by executing rotational coordinate transformation of a command d-axis voltage constituting a magnetic flux component and a command q-axis voltage constituting a torque component perpendicular thereto by using a control phase angle;
a conductive signal generator that generates a three-phase conductive signal based on the three-phase command voltage; and
a position controller that, when executing a positioning operation, maintains the command d-axis voltage at a constant value, the command q-axis voltage at zero, and the control phase angle at a constant value, and that obtains a voltage correction value of each phase based on a difference between a target stop rotational position and a rotational position detected by the rotational position detector to correct the three-phase command voltage by the voltage correction value.

15. The motor control unit of claim 14, further comprising a control phase angle generator that generates a control phase angle corresponding to a rotational position detected by the rotational position detector, a rotational speed detector that detects a rotational speed based on a rotational position detected by the rotational position detector, a speed controller that generates the command q-axis voltage based on a difference between a command rotational speed and a rotational speed detected by the rotational speed detector, and the position controller that, when executing a positioning operation, allows switching between a first control mode that validates the control phase angle generator, the rotational speed detector, and the speed controller, and that generates the command rotational speed based on a difference between the target stop rotation position and a rotational position detected by the rotational position detector; and a second control mode that invalidates the control phase angle generator, the rotational speed detector, and the speed controller, and that maintains the command d-axis voltage at a constant value and the command q-axis voltage at zero, and the control phase angle at a constant value, and that obtains a voltage correction value of each phase based on a difference between the target stop rotational position and a rotational position detected by the rotational position detector to correct the three-phase command voltage by the voltage correction value.

16. The motor control unit of claim 15, wherein the position controller executes positioning by switching from the first control mode to the second control mode when a difference between the target stop rotation position and a rotational position detected by the rotational position detector is equal to or less than a predetermined value.

* * * * *